United States Patent
Kaforey et al.

(10) Patent No.: US 10,188,570 B1
(45) Date of Patent: Jan. 29, 2019

(54) METHOD OF REDUCING SURGEON FATIGUE DURING AN OPERATION WHILE REDUCING COLLECTION OF FLUIDS FROM THE OPERATION ON THE FLOOR OF THE OPERATING ROOM BY ABSORBING FLUIDS LEAKING ONTO THE FLOOR OF THE OPERATING ROOM AND APPARATUS THEREFOR

(71) Applicants: Craig Kaforey, New Kensington, PA (US); Mark Kaforey, New Kensington, PA (US); Paul Lloyd, New Kensington, PA (US)

(72) Inventors: Craig Kaforey, New Kensington, PA (US); Mark Kaforey, New Kensington, PA (US); Paul Lloyd, New Kensington, PA (US)

(73) Assignee: XODUS MEDICAL, INC. PA (US)

( * ) Notice: Subject to any disclaimer, the term of this patent is extended or adjusted under 35 U.S.C. 154(b) by 0 days.

(21) Appl. No.: 15/433,518

(22) Filed: Feb. 15, 2017

Related U.S. Application Data

(60) Provisional application No. 62/295,655, filed on Feb. 16, 2016.

(51) Int. Cl.
  *B32B 5/18* (2006.01)
  *A61G 12/00* (2006.01)
  (Continued)

(52) U.S. Cl.
  CPC .......... *A61G 12/00* (2013.01); *A47G 27/0206* (2013.01); *A47G 27/0231* (2013.01); *B01J 20/261* (2013.01); *B01J 20/28035* (2013.01); *B32B 5/028* (2013.01); *B32B 5/18* (2013.01); *B32B 7/12* (2013.01); *B32B 27/065* (2013.01); *B32B 27/12* (2013.01); *B32B 27/32* (2013.01); *B32B 2250/04* (2013.01);
  (Continued)

(58) Field of Classification Search
  CPC .......... Y10T 428/237; Y10T 428/24331; Y10T 137/5762; A61G 13/102
  See application file for complete search history.

(56) References Cited

U.S. PATENT DOCUMENTS

| 3,016,317 A | 1/1962 | Brunner |
| 4,328,275 A | 5/1982 | Vargo |

(Continued)

*Primary Examiner* — Alexander S Thomas
(74) *Attorney, Agent, or Firm* — Nils H. Ljungman & Associates

(57) ABSTRACT

A method of reducing surgeon fatigue during an operation while reducing collection of fluids from the operation on the floor of the operating room by absorbing fluids leaking onto the floor of the operating room and apparatus therefor. The abstract of the disclosure is submitted herewith as required by 37 C.F.R. § 1.72(b). As stated in 37 C.F.R. § 1.72(b): A brief abstract of the technical disclosure in the specification must commence on a separate sheet, preferably following the claims, under the heading "Abstract of the Disclosure." The purpose of the abstract is to enable the Patent and Trademark Office and the public generally to determine quickly from a cursory inspection the nature and gist of the technical disclosure. The abstract shall not be used for interpreting the scope of the claims. Therefore, any statements made relating to the abstract are not intended to limit the claims in any manner and should not be interpreted as limiting the claims in any manner.

20 Claims, 19 Drawing Sheets

(51) Int. Cl.
*A47G 27/02* (2006.01)
*B32B 7/12* (2006.01)
*B32B 5/02* (2006.01)
*B32B 27/06* (2006.01)
*B32B 27/32* (2006.01)
*B32B 27/12* (2006.01)
*B01J 20/26* (2006.01)
*B01J 20/28* (2006.01)

(52) U.S. Cl.
CPC ....... *B32B 2255/10* (2013.01); *B32B 2255/26* (2013.01); *B32B 2262/0253* (2013.01); *B32B 2266/0278* (2013.01); *B32B 2266/08* (2013.01); *B32B 2307/56* (2013.01); *B32B 2307/7265* (2013.01); *B32B 2307/744* (2013.01); *B32B 2471/04* (2013.01); *Y10T 428/237* (2015.01); *Y10T 428/24331* (2015.01)

(56) References Cited

U.S. PATENT DOCUMENTS

| | | | |
|---|---|---|---|
| 4,822,669 | A | 4/1989 | Roga |
| 5,028,468 | A | 7/1991 | Taylor |
| 5,173,346 | A | 12/1992 | Middleton |
| 5,607,745 | A | 3/1997 | Ogden |
| 6,610,382 | B1 | 8/2003 | Kobe et al. |
| 7,192,631 | B2 | 3/2007 | Polley |
| 7,309,519 | B2 | 12/2007 | Scholz et al. |
| 7,445,833 | B2 | 11/2008 | Polley |
| 7,785,692 | B1 | 8/2010 | Siegel et al. |
| 8,142,410 | B2 | 3/2012 | Rovaniemi |
| 8,839,812 | B2 | 9/2014 | Tanhehco et al. |
| 2004/0261209 | A1 | 12/2004 | McKay |
| 2014/0076358 | A1 | 3/2014 | Irwin et al. |

_US 10,188,570 B1_

METHOD OF REDUCING SURGEON FATIGUE DURING AN OPERATION WHILE REDUCING COLLECTION OF FLUIDS FROM THE OPERATION ON THE FLOOR OF THE OPERATING ROOM BY ABSORBING FLUIDS LEAKING ONTO THE FLOOR OF THE OPERATING ROOM AND APPARATUS THEREFOR

BACKGROUND

1. Technical Field

The present application related to a method of reducing surgeon fatigue during an operation while reducing collection of fluids from the operation on the floor of the operating room by absorbing fluids leaking onto the floor of the operating room and apparatus therefor.

2. Background Information

Background information is for informational purposes only and does not necessarily admit that subsequently mentioned information and publications are prior art.

This application relates generally to absorbent, anti-fatigue, disposable floor mats for use during medical procedures, specifically absorbent, anti-fatigue, disposable floor mats that can be used during surgical procedures for the absorption of bodily fluids or medical liquids over the course of a surgical procedure, which fluids or liquids must be sanitarily contained and later removed from the procedural area.

In the field of medical procedures, especially surgery or surgical procedures, medical personnel, such as surgeons, usually must stand, often in a specific location, for a substantial period of time, depending on the medical or surgical procedure being performed. A support structure, such as a floor mat or similar structure, may be provided, on which the medical personnel may stand during the medical or surgical procedure. The support structure may be designed to be comfortable and produce an anti-fatigue effect on the medical personnel, so as to reduce physical stresses on the body of the medical personnel, and thereby reduce fatigue. A reduction in physical stress and fatigue may result in increased energy and awareness for the medical personnel during the medical or surgical procedure.

In addition, the medical or surgical procedure may involve dispersal of liquids onto various areas of the room in which the procedure is being performed, such as an operating room. Such liquids may include bodily fluids, such as blood or urine, or fluids used in the medical procedure, such as flushing fluids or intravenous fluids. If such liquids are deposited onto the floor of the room, the accumulated liquid could present a hazard to the medical personnel, who may possibly slip on the liquid. In addition, the liquid could possibly contain biologically hazardous material or other contaminants, which could endanger medical personnel, or which could lead to future contamination of the room.

OBJECT OR OBJECTS

An object of an exemplification of the present application is to provide a floor mat or similar support structure that reduces fatigue for a person standing on the floor mat, absorbs and captures fluids deposited on the floor mat, and minimizes contamination of a room or area in which the floor mat is used.

SUMMARY

The object may be achieved in a floor mat or similar support structure according to at least one possible exemplification disclosed herein. The mat may be of a generally flat, rectangular design. The corners may be rounded. The mat may have a length of approximately 35 inches (88.90 centimeters (cm)), a width of approximately 22 inches (55.88 cm), and a thickness of approximately 0.75 inch (1.90 cm). Other lengths and widths and thicknesses are possible for the mat, and may be selected based on the desired use or function. For example, a larger mat may be desired to accommodate more than one person standing thereon, or to address situations in which a more substantial volume of fluids or liquids will be deposited onto the floor mat, or in which the fluids or liquids will be deposited over a greater area. A smaller mat may be desired if space is limited. Different shapes of the mat, such as circles, ovals, triangles, and trapezoids, may be desirable in situations in which the mat must be placed in an area of restricted floor space, such as adjacent machinery or equipment or walls.

The mat, according to at least one possible exemplification, may include a first layer, a second layer, a third layer, a fourth layer, a fifth layer, and a sixth layer. When placed on a floor of a room, the layers are arranged as follows: sixth layer on the floor, fifth layer on top of the sixth layer, fourth layer on top of the fifth layer, third layer on top of the fourth layer, second layer on top of the third layer, and first layer on top of the second layer. The first layer is essentially the top layer and the sixth layer is essentially the bottom layer, with the other layers sandwiched in between the first and sixth layers.

An example of an absorbent structure or mat for capturing and/or containing liquids or fluids is The Camel Mat®, currently sold by Xodus Medical, Inc., located at Westmoreland Business & Research Park, 702 Prominence Dr., New Kensington, Pa. 15068. This mat has multiple layers, one or more of which could be used or incorporated for use in the floor mat according to the present application. It should also be noted that a floor mat according to the present application is currently in stock at Xodus Medical, Inc., as of the filing date of this application, and is intended to be made available to the public for purchase in February or March, 2016, that is, within a few weeks of the filing date of this application.

The first, or top, layer is to be contacted by at least one foot of one or more medical personnel standing on the floor mat. The first layer may be perforated or have holes or openings formed or cut therein. The holes may be arranged in essentially any desired pattern, or may be scattered irregularly. The holes may be uniform in diameter or may vary in diameter. The holes may be circular or oval in shape, or another shape as desired. The holes may be arranged in groups divided or spaced apart from one another by solid sections of the first layer. The holes may possibly be in the range of about 8-15 millimeters (mm) in diameter, or may be about 11 or 12 mm in diameter. The holes or openings in the first layer permit liquid to pass through the first layer to the second layer. The first layer may be made of a closed cell, polyurethane foam. The polyurethane foam is of a thickness and composition so as to absorb shocks and reduce fatigue on a person standing on the mat. For example, personnel working in a medical or surgical environment may possibly be required to stand on the mat for extended periods of time, such as a few to several hours. The polyurethane foam is designed to cushion and displace force in order to bring comfort to the person standing on the mat, as well as reduce fatigue when standing on the mat for extended periods of time. Tests were conducted on a sample of polyurethane foam material that can be used in the first layer, in accordance with American Society for Testing and Materials (ASTM) standard D3574-11, density, indentation force deflection (IFD), compression set, and ball rebound. For density, three specimens were tested according to ASTM D3574-11, sections 9-15. The specimens were first conditioned 24 hours minimum at 23+/−2° C.; 50+/−50% relative humidity (RH). Specimens 1 and 2 each had a density of 21.4 kilograms per cubic meter ($kg/m^3$), and Specimen 3 was 21.5 $kg/m^3$, for a mean of 21.5 $kg/m^3$. For the IFD, one specimen, measuring 383 mm×383 mm×101 mm, was tested according to ASTM D3574-11, sections 16-22. The specimen was first conditioned 24 hours minimum at 23+/−2° C.; 50+/−50% RH. The indenter foot was 203 mm in diameter. The pre-flex was performed twice to a total deflection of 70 to 80% of full part thickness at a rate of 250+/−25 mm/minute, and allow part to rest 6+/−1 minute. The pre-load was 4.5 Newtons (N), and the test speed was 50 mm/minute. The first deflection was 25%, hold for 60+/−3 seconds, and the second deflection was increased to 65%, hold for 60+/−3 seconds. The test results were as follows: specimen thickness at 4.5 N pre-load—98.30 mm; IFD at 25%—1840 N; IFD at 65%—6757 N; and support factor ratio—3.67. For the compression set, three samples were tested according to ASTM D3574-11, sections 37-44. The samples were first conditioned 24 hours minimum at 23+1-2° C.; 50+/−5% RH. The compression was 50%, and the exposure was 22 hours at 70+1-2° C. For Sample 1, the compression set was 53.5%, for Sample 2, 53.0%, and for Sample 3, 53.9%, for a mean of 53.4%. For the ball rebound, three samples were tested according to ASTM D3574-11, sections 68-75. The samples were first conditioned 24 hours minimum at 23+/−2° C.; 50+1-5% RH. A steel ball having a diameter of 16.3+/−0.2 mm was dropped from a height of 500 mm (top of the steel ball—516 mm). For Sample 1, the rebound height was 236 mm, for a ball rebound of 47.2%. For Sample 2, the rebound height was 215 mm, for a ball rebound of 43.0%. For Sample 3, the rebound height was 226 mm, for a ball rebound of 45.2%. The mean was rebound height was 226, and the mean ball rebound was 45.2%.

The fifth layer is disposed between the fourth and sixth layers. The fifth layer may be of essentially the same or similar dimensions and/or design as the first layer. For example, in at least one possible exemplification, the first layer and fifth layer have the same length, width, and thickness, and are made of the same material, with the only difference being the holes or openings in the first layer.

The second, third, and fourth layers are stacked one on top of the other between the first and fifth layers. The second, third, and fourth layers each have an area or size that may be less than that of the first layer and the fifth layer, such that an outer surface portion of the underside of the first layer is in contact with an outer surface portion of the topside of the fifth layer. The first layer may be joined or connected to the fifth layer at these outer surface portions, such as by an adhesive or other connecting or joining structure or method or material. Consequently, the first and fifth layers may essentially enclose or sandwich the second, third, and fourth layers therein such that no liquid or essentially no liquid can escape out between the first and fifth layers.

The second layer is disposed between the first and third layers. The second layer is partially visible through the holes in the first layer. The second layer may be made of a polypropylene material or similar material in the form of a translucent or transparent or see-through printed netting. The second layer may serve as a structural support to protect the third layer from mechanical or structural damage, such as by fraying or tearing apart. The second layer may be white in color. The second layer may be liquid permeable to allow liquid to pass to the third layer.

The third layer is disposed between the second and fourth layers. The third layer may be partially visible through the holes in the first layer if the second layer is sufficiently or substantially translucent and/or thin. The third layer may be made of a polypropylene or polypropylene fibrous material or similar material configured to absorb and retain liquid. The volume of absorbency of the third layer could be approximately in the range of 17-20 fluid ounces (502.75-591.471 milliliters (mL)) of liquid per square foot (0.0929 square meter ($m^2$)) of material, such as 18.73 fluid ounces (553.912 mL), measured as a linear product. Alternatively, the volume of absorbency of the third layer could be approximately in the range of 58-61 fluid ounces (1715.26-1803.99 mL) of liquid per cubic foot (0.0283168 cubic meter ($m^3$)) of material, such as 59.52 fluid ounces (1760.2165 mL), measured in a volumetric manner. The third layer may be yellow in color. The third layer is therefore used to capture or contain liquids or fluids would otherwise be deposited on the floor of the area in which personnel are working, such as during the performance of a medical or surgical procedure in a medical or surgical room. The third layer contains liquids to maintain the floor of the room essentially or substantially dry and/or free of liquid, in order to minimize contamination and/or slips or falls due to a wet or slick floor surface.

The fourth layer is disposed between the third and fifth layers. The fourth layer may be made of a polyethylene or similar material configured to be impervious to the passage of fluid therethrough. The fourth layer helps prevent or minimize leakage of any liquids or fluids not contained by the third layer. The fourth layer may be a thin, clear, fluid-resistant backing or film.

The sixth layer is disposed below the fifth layer and is attached thereto, such as by an adhesive or other attachment means or structure or material. One example of an adhesive structure that may be used to join the fifth layer and the sixth layer is an acrylic, pressure sensitive, polyethylene terephthalate (PET) film adhesive. The sixth layer is designed to function as an anti-skid or adhesive-like surface to minimize, or essentially prevent, or prevent, unwanted movement, sliding, or skidding of the floor mat across or along the floor of the room in which the floor mat is situated or positioned. In at least one possible exemplification, the sixth layer can have a mesh or mesh-like design or structure formed from a plurality of criss-crossing or intersecting lines or strands of material, such that the sixth layer has a plurality of irregularly-shaped and irregularly-spaced holes or openings therein. For example, in a 25.4 mm by 25.4 mm square sample of mesh material according to at least one possible exemplification, there are approximately 73 complete holes or openings, though the number could be higher or lower within a range of 60-90 holes or openings. The strands or lines of material in the mesh could be of various thicknesses in the range of approximately 0.5-2.5 mm in thickness and/or diameter. It should be understood that the preceding range and any other range disclosed herein includes ranges in whole numbers or tenths of a whole number or hundredths of a whole number. For example, it should be understood that a range of 0.5-2.5 mm also includes other ranges therein, such as 1.0-2.0 mm or 0.8-2.3 mm or 0.75-2.25 mm. The mesh can also be in the form of small blobs or drops of material interconnected by small strands of material. The irregular design or structure of the material could possibly aid in producing a greater friction with a surface on which the mat is placed to contribute to the anti-skid properties of the sixth layer. In at least one possible exemplification, the sixth layer is made of a material that is pink in color.

In at least one possible exemplification, the sixth layer is made of polyvinyl chloride (PVC), such as a PVC foam material. Since the material is to be used as an anti-skid layer, there must be sufficient friction or resistance to sliding exhibited by the material when placed on a surface, such as a floor surface. In that regard, three samples of a PVC foam material were tested regarding their coefficients of friction in accordance with ASTM standard D1894-14 ("Standard Test Method for Static and Kinetic Coefficients of Friction of Plastic Film and Sheeting"). The samples were tested at room temperature/ambient air (23+/−2° C.; 50+/−10% RH). An apparatus, similar to apparatus (d) from FIG. 1 of ASTM D1894-14 was used for testing. The sliding orientation when sliding the PVC foam material across the plane material was chosen at random. The surface that was used as the base was a vinyl floor tile. The average sliding load was calculated over a distance of 127 mm, starting within approximately 12.7 mm beyond the peak load, and having a maximum of 139.7 mm. The three samples had different dimensions. Sample 1 was 0.81 mm thick by 119.46 mm wide by 119.96 mm long. Sample 2 was 0.76 mm×112.67 mm×119.70 mm. Sample 3 was 0.73 mm×121.83 mm×115.23 mm. The data from the testing of each sample is shown in Table 1. The load and force values are measured in grams (g), as noted. Graphs showing load vs. crosshead displacement data for Samples 1, 2, and 3 are provided in FIGS. 14, 15, and 16, respectively.

TABLE 1

Coefficient of Friction test for PVC Foam material

| Sample | Coefficient of friction | | Normal Force (g) | | Max Load (g) | Average Sliding Load (g) |
|---|---|---|---|---|---|---|
| | Static | Kinetic | Sled | Coupon | | |
| 1 | 1.705 | 0.851 | 203.9248 | 3.8863 | 354.3 | 176.9 |
| 2 | 1.634 | 0.792 | 203.9248 | 3.4545 | 338.8 | 164.3 |
| 3 | 1.775 | 0.644 | 203.9248 | 3.5427 | 368.3 | 133.5 |
| | 1.70 | 0.763 | | Average | | |
| | 0.0707 | 0.1071 | | Standard Deviation | | |
| | 4.15 | 14.0 | | Coefficient of Variation | | |

Another piece of PVC foam was tested for density according to Method A of ASTM D792-13. To perform density testing, three 25.4 mm by 25.4 mm specimens were cut from the material. Prior to testing, the density specimens were conditioned in a laboratory atmosphere for a minimum duration of 40 hours. Once conditioned, the density of each specimen was determined using a Mettler-Toledo XS205 Density Balance using laboratory air and 22.5° C. Type 4 deionized water. The results of the density measurements can be found in Table 2. The density is measured in grams per cubic centimeter (g/cc).

TABLE 2

Testing of PVC Foam Material

| Sample | Density (g/cc) |
|---|---|
| 1 | 0.532 |
| 2 | 0.521 |

TABLE 2-continued

Testing of PVC Foam Material

| Sample | Density (g/cc) |
|---|---|
| 3 | 0.520 |
| Average | 0.524 |
| Standard Deviation | 0.007 |
| Coefficient of Variance | 1.270 |

An additional five samples of the PVC foam material were tested according to ASTM D638-14 for tensile strength, modulus of elasticity, and elongation. The target speed of the testing was 0.2000 inches per minute (5.08 mm per minute). The specimens were stamped out using an ASTM D638 Type 1 (U.S. Customary Units) die. Specimens were extracted perpendicular to the vein direction. The width of the die and the actual thickness of the material were used in stress calculations. Each specimen end was reinforced with 120 grit silicon oxide abrasive paper, and then restrained within mechanically actuated wedge grips at an indeterminate grip pressure. No pre-test conditioning was conducted. The laboratory environment was 23+/−2.0° C./50+/−10% R.H. An MTS Model 634 25E-19 extensometer with a 2.0 gage length and a Class B2 verification was used to acquire strain measurements. Each sample had the same width of 0.4990 inches (12.6746 mm). Sample 1 had a thickness of 0.7874 mm and an original area of 9.9907 square millimeters (mm$^2$). Sample 2 had a thickness of 0.8179 mm and an original area of 10.3663 mm$^2$. Sample 3 had a thickness of 0.7696 mm and an original area of 9.7654 mm$^2$. Sample 4 had a thickness of 0.7747 mm and an original area of 9.8083 mm$^2$. Sample 5 had a thickness of 0.7620 mm and an original area of 9.6580 mm$^2$. The results of the testing are shown in Table 3.

TABLE 3

Testing of PVC foam material
(tensile strength, modulus of elasticity, and elongation)

| Sample | Tensile Strength at Break PSI | Elongation at Break % | Modulus PSI | Load at Break lbf |
|---|---|---|---|---|
| 1 | 446 | 10.97 | 4620 | 6.90 |
| 2 | 394 | 10.98 | 3870 | 6.32 |
| 3 | 399 | 11.13 | 3580 | 6.03 |
| 4 | 418 | 10.83 | 4050 | 6.36 |
| 5 | 525 | 10.62 | 4610 | 7.86 |

The following provides the statistical summaries for all five samples in the group. For Tensile Strength at Break (psi), the average was 436 the standard deviation was 54, and the coefficient of variation was 12.27%. For Modulus of Elasticity (psi), the average was 4150, the standard deviation was 460, and the coefficient of variation was 11.09%. For Elongation at Break (%), the average was 10.9, the standard deviation was 0.19, and the coefficient of variation was 1.76%. Stress/strain graphs are provided for Samples 1-3 and Samples 4-5 on FIGS. 17 and 18, respectively.

It should be understood that the exemplary values and ranges disclosed herein are not meant to limit the subject matter of the claims. It should also be understood that the exemplary values and ranges disclosed herein represent additional ranges of values of +/−25% of the value or range. For example, the coefficient of static friction of sample 1 in Table 1 is 1.705. However, a material may be used that has a coefficient of static friction that is higher or lower than 1.705, such as within a range of +/−25%, that is, a range of 1.28 to 2.13. Other ranges are similarly represented by other values. The other ranges should be understood to include values in whole numbers, tenths of whole numbers, and hundredths of whole numbers of the ranges disclosed.

The above-discussed exemplifications of the present invention will be described further herein below. When the word "invention" or "exemplification of the invention" is used in this specification, the word "invention" or "exemplification of the invention" includes "inventions" or "exemplifications of the invention", that is the plural of "invention" or "exemplification of the invention". By stating "invention" or "exemplification of the invention", the Applicant does not in any way admit that the present application does not include more than one patentably and non-obviously distinct invention, and maintains that this application may include more than one patentably and non-obviously distinct invention. The Applicant hereby asserts that the disclosure of this application may include more than one invention, and, in the event that there is more than one invention, that these inventions may be patentable and non-obvious one with respect to the other.

DESCRIPTION OF EXEMPLIFICATION OR EXEMPLIFICATIONS

Figure 1:
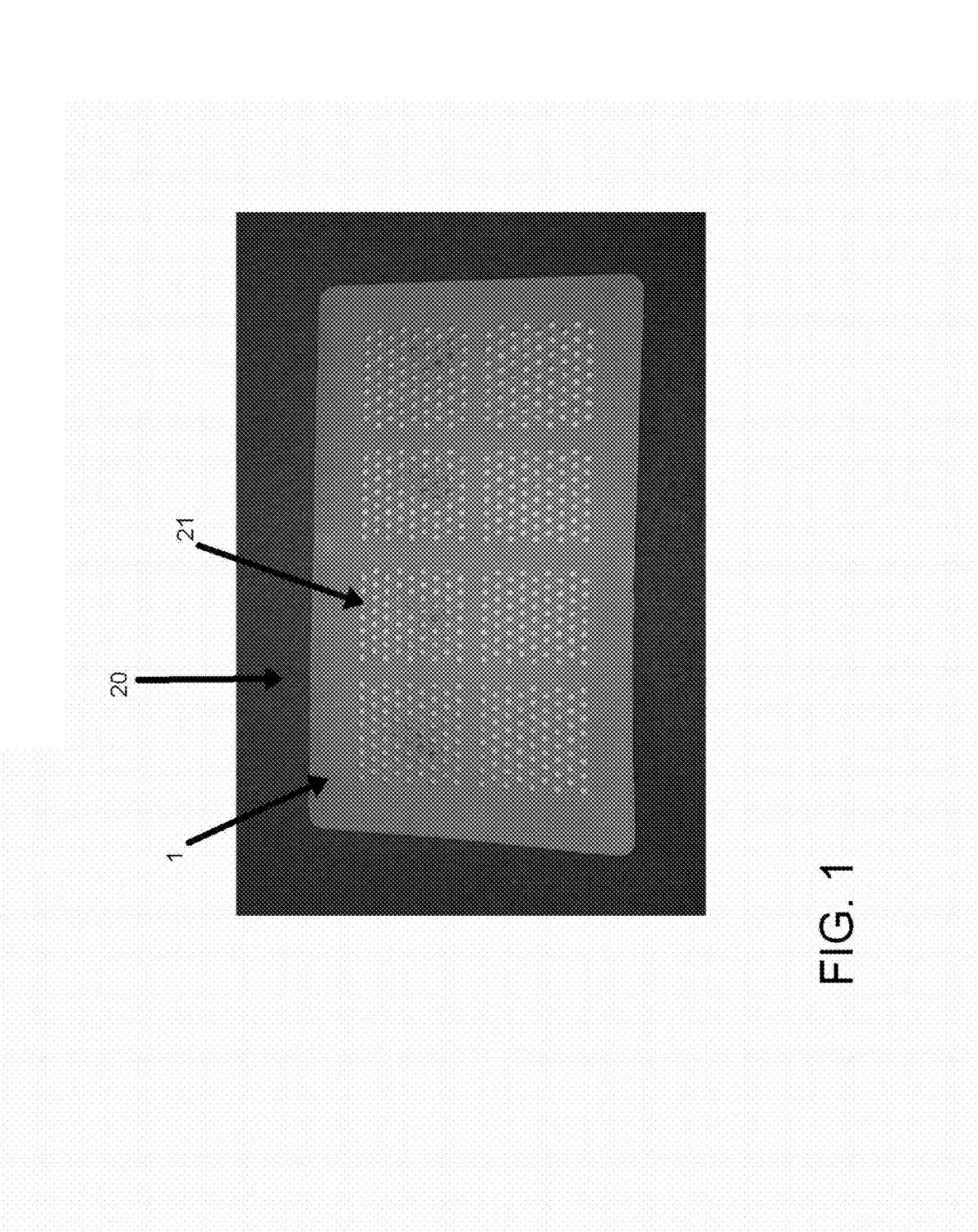
FIG. 1 shows a view of a top of a floor mat.

FIG. 1 shows a view of a top of a floor mat 20 that has a first layer 1, a second layer 2, a third layer 3, a fourth layer 4, a fifth layer 5, and a sixth layer 6, arranged sequentially one after the other in a layered or sandwiched style. When positioned on a floor surface or other surface for use, the first layer 1 is the top or uppermost layer, and the sixth layer 6 is the bottom or lowermost layer. The first layer 1 is visible in FIG. 1, as well as a plurality of holes 21 in the first layer 1. This first layer 1 may be a polyurethane foam.

Figure 2:
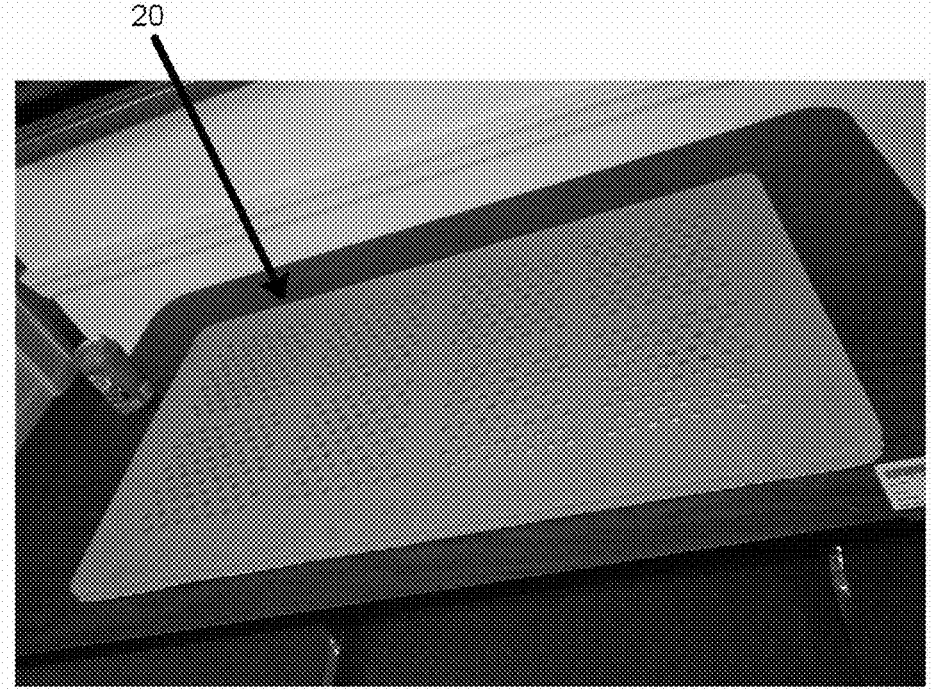
FIG. 2 shows a perspective view of the top of the floor mat.

FIG. 2 shows a perspective view of the top of the floor mat 20. The floor mat 20 has a generally rectangular shape with rounded corners.

Figure 3:
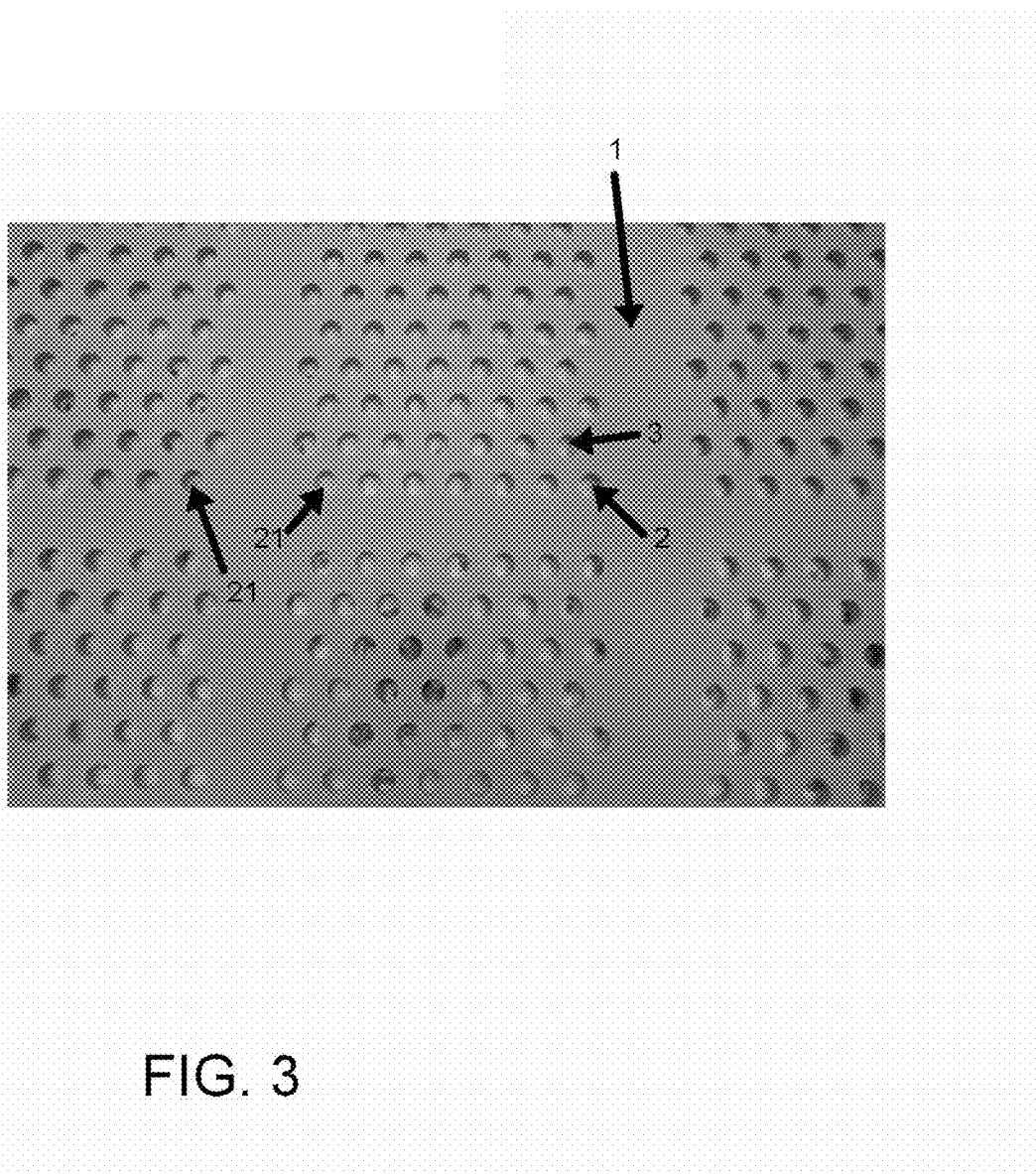
FIG. 3 shows a close-up view of the top of the floor mat.

FIG. 3 shows a close-up view of the top of the floor mat 20. The first layer 1 is foremost in FIG. 3, and has a plurality of the holes 21 therein. The second layer 2 is visible through the holes 21. The second layer 2 may be essentially transparent, translucent, or essentially or substantially see-through such that the third layer 3 is visible or can be seen through the holes 21.

Figure 4:
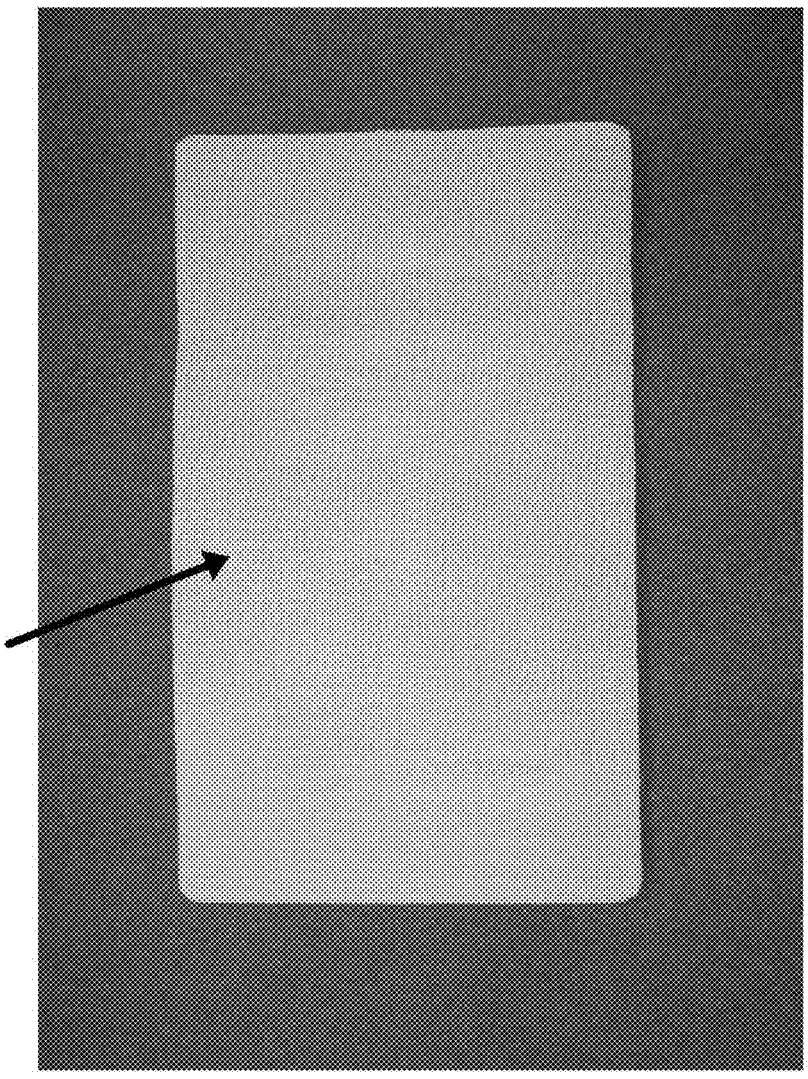
FIG. 4 shows a view of a bottom of the floor mat.

FIG. 4 shows a view of a bottom of the floor mat 20, wherein the sixth layer 6 is visible.

Figure 5:
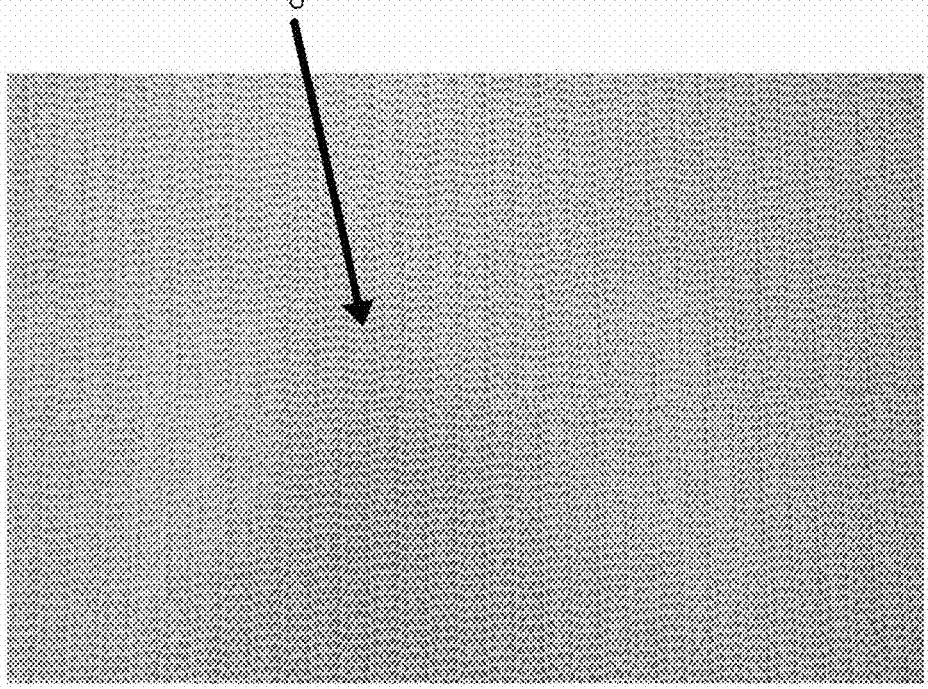
FIG. 5 shows a close-up view of the bottom of the floor mat.

FIG. 5 shows a close-up view of the bottom of the floor mat 20, which includes the sixth layer 6. As can be seen in FIG. 5, the sixth layer 6 has a mesh or mesh-like or lattice-like design with holes or openings therein. Portions of the fifth layer 5 are visible through the holes or openings therein.

Figure 6:
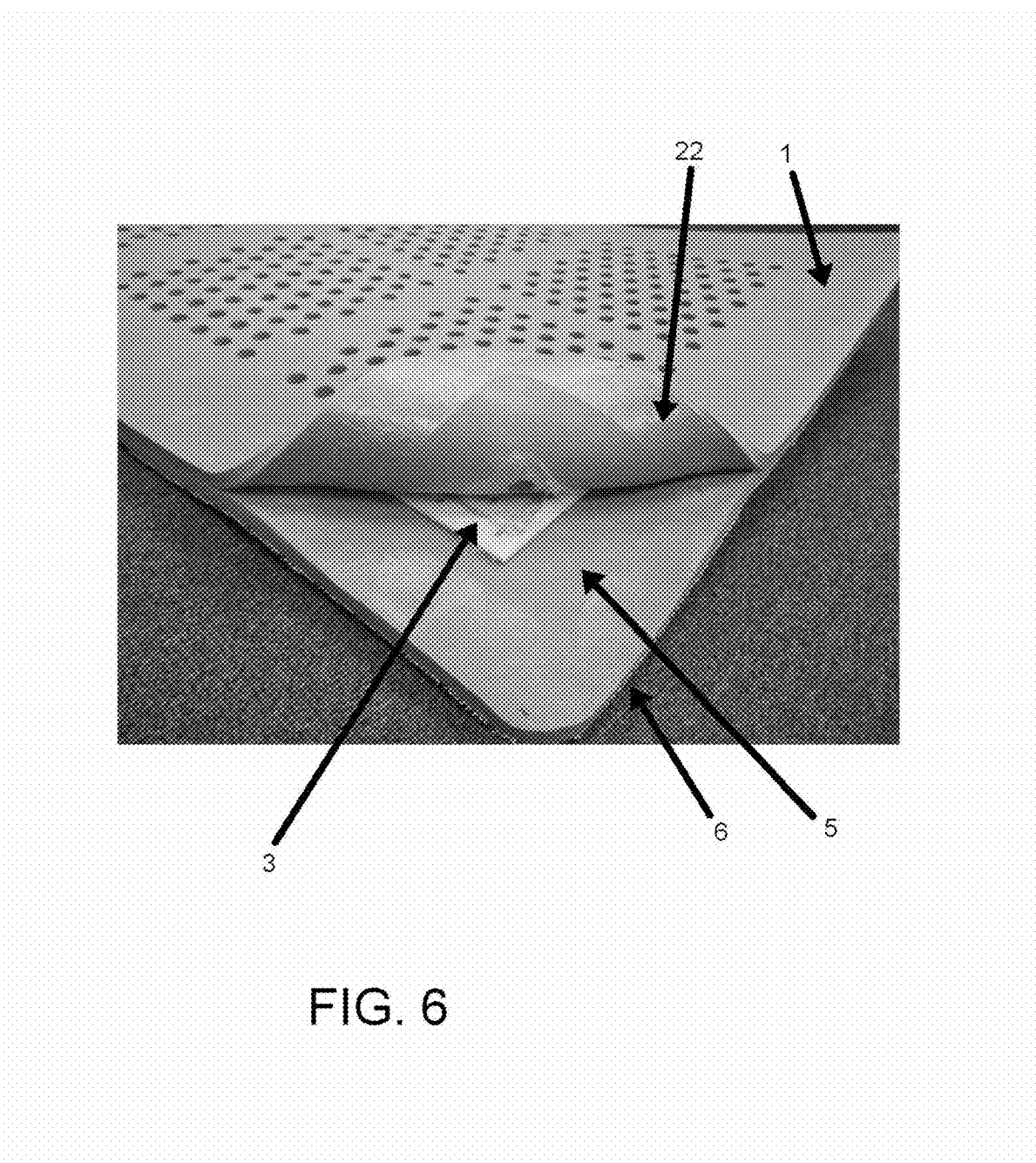
FIG. 6 shows a view of a corner portion of the floor mat with the interior exposed.

FIG. 6 shows a view of a corner portion of the floor mat 20 with the interior exposed. A connecting structure 22, which is an adhesive, adhesive film, or similar material, which may be a synthetic adhesive, is disposed about the perimeter of the first layer 1 and/or the fifth layer 5 to join the first layer 1 and the fifth layer 5. The outer edge of the sixth layer 6 and a corner portion of the third layer 3 are visible in FIG. 6. The third layer 3 has a smaller length and width, that is, covers a smaller area, than the first layer 1 and the fifth layer 5, and thus is not contacted by the connecting structure 22. Upon sealing or joining or bonding or connecting of the perimeter portions or edge portions of the first layer 1 and fifth layer 5 using the connecting structure 22, the third layer 3 is essentially or substantially sealed or enclosed or sandwiched inside or within or between the first layer 1 and fifth layer 5.

Figure 7:
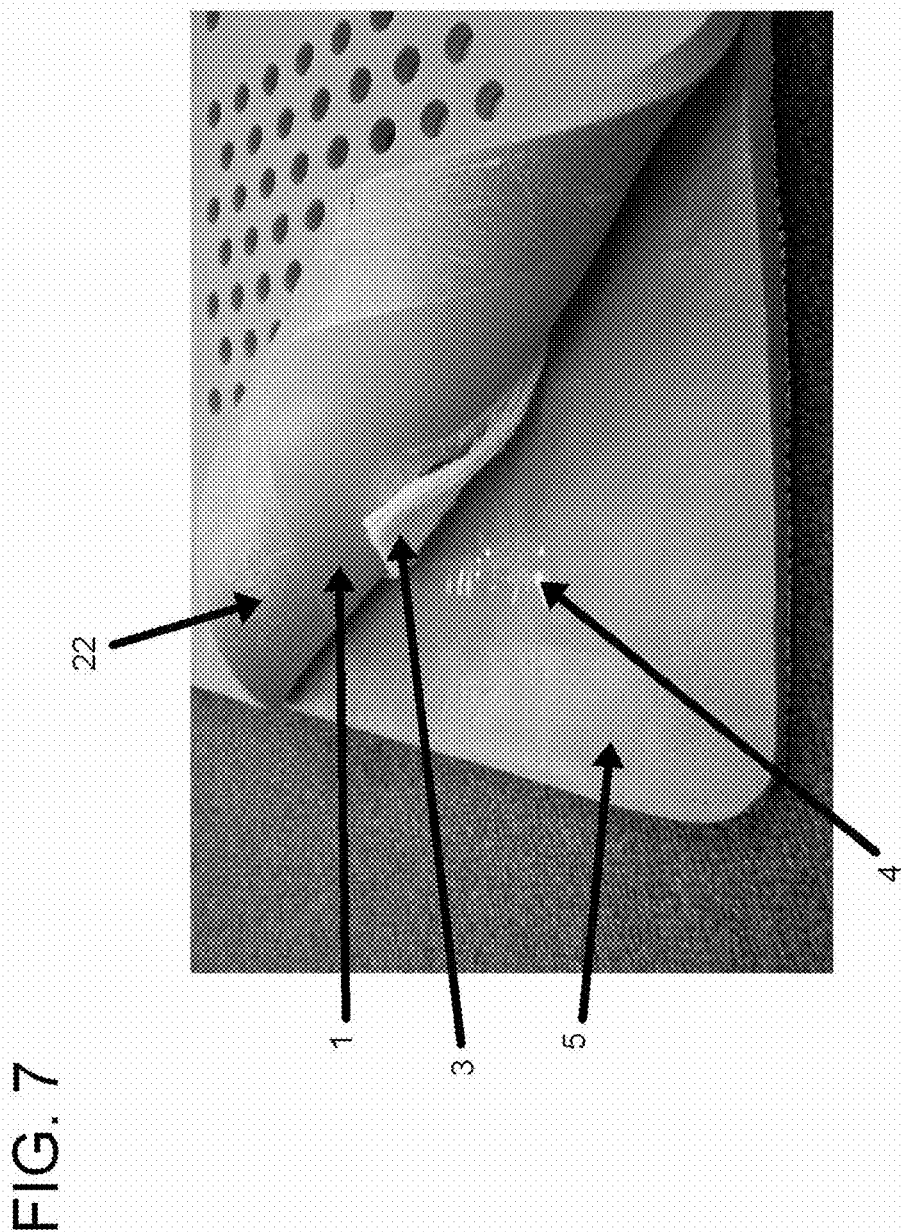
FIG. 7 shows an additional view of the corner portion of the floor mat.
Figure 8:
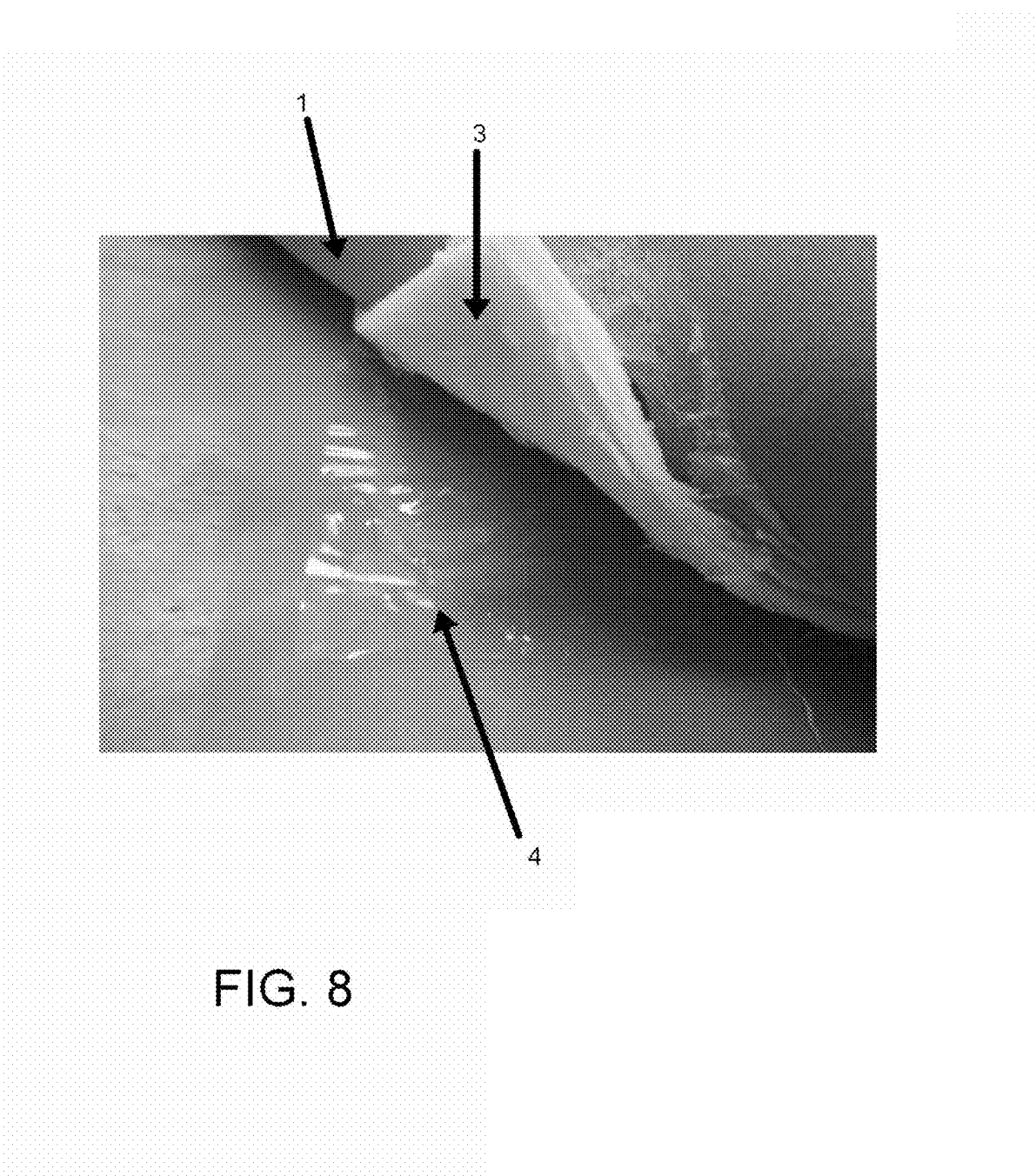
FIG. 8 shows another view of the corner portion of the floor mat.

FIG. 7 shows an additional view of the corner portion of the floor mat 20. In FIG. 7, the third layer 3 has been lifted to expose a portion of the fourth layer 4. FIG. 8 shows another view of the corner portion of the floor mat 20, with a closer view of the portions of the third layer 3 and the fourth layer 4.

Figure 9:
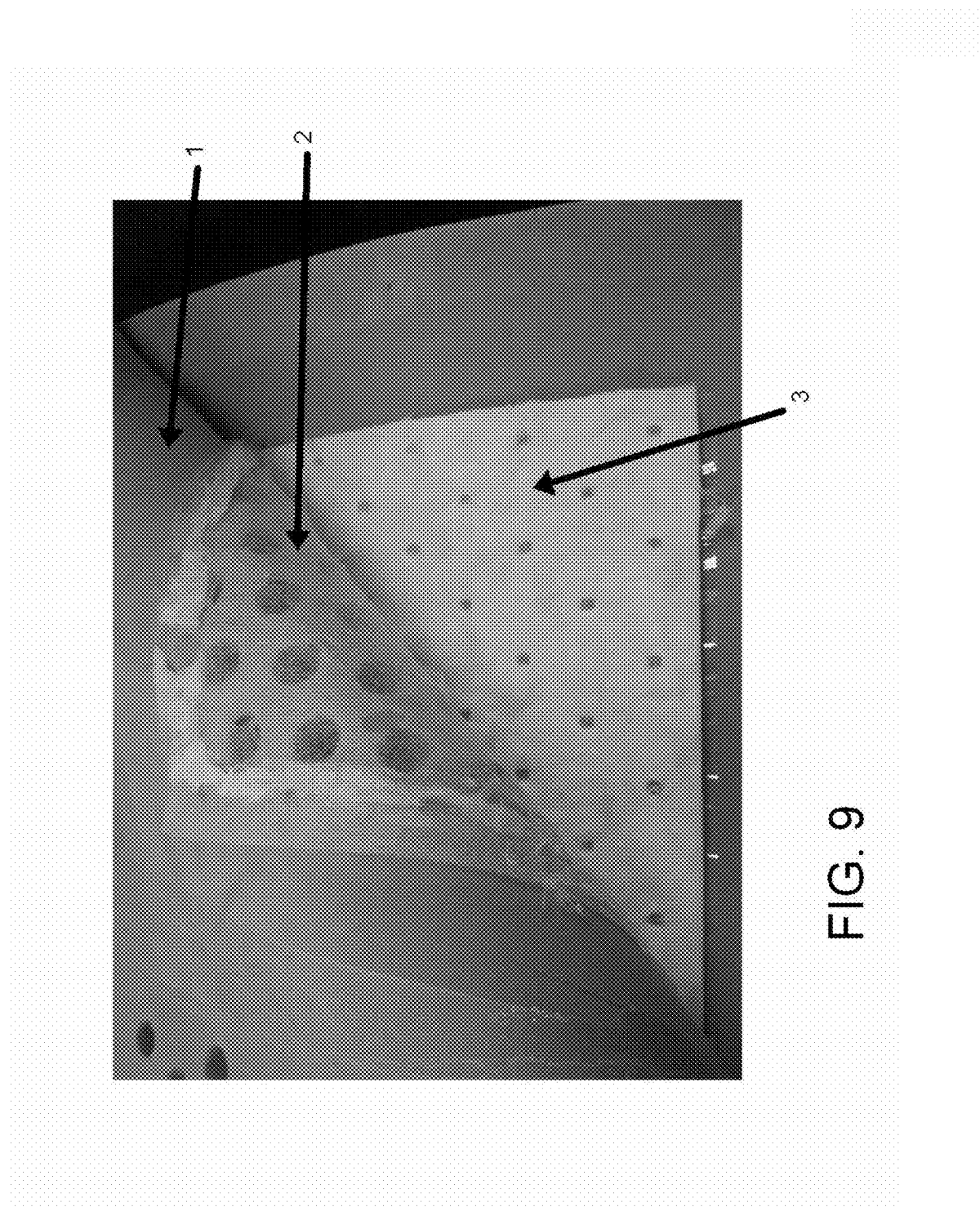
FIG. 9 shows yet another view of the corner portion of the floor mat.

FIG. 9 shows yet another view of the corner portion of the floor mat 20. In FIG. 9, the second layer 2 has been lifted away or separated from the third layer 3. The underside of the first layer 1 is visible through the second layer 2.

Figure 10:
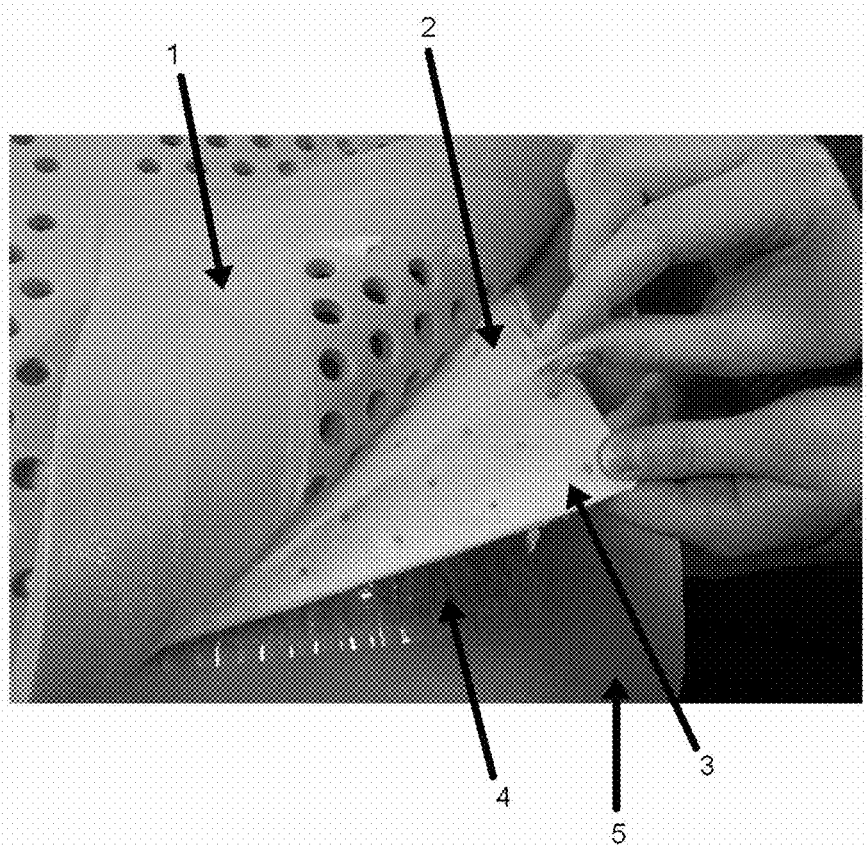
FIG. 10 shows a further view of the corner portion of the floor mat.
Figure 11:
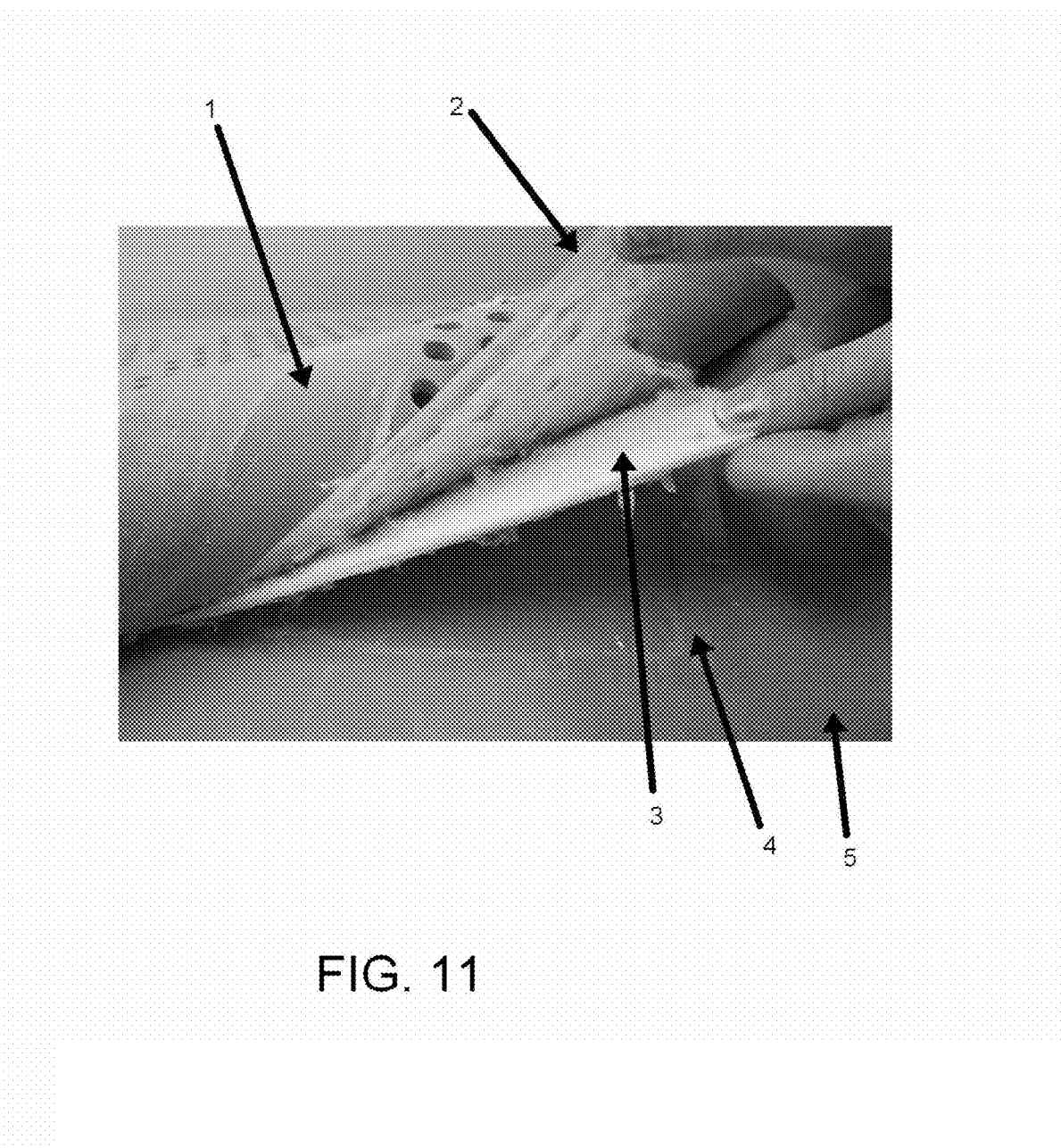
FIG. 11 shows still yet another view of the corner portion of the floor mat.

FIG. 10 shows a further view of the corner portion of the floor mat 20. In FIG. 10, each of the first layer 1, the second layer 2, the third layer 3, and the fourth layer 4 are being held separate from one another so each layer can be seen. FIG. 11 shows still yet another view of the corner portion of the floor mat 20. FIG. 11 is essentially a different view of the layers as shown in FIG. 10.

Figure 12:
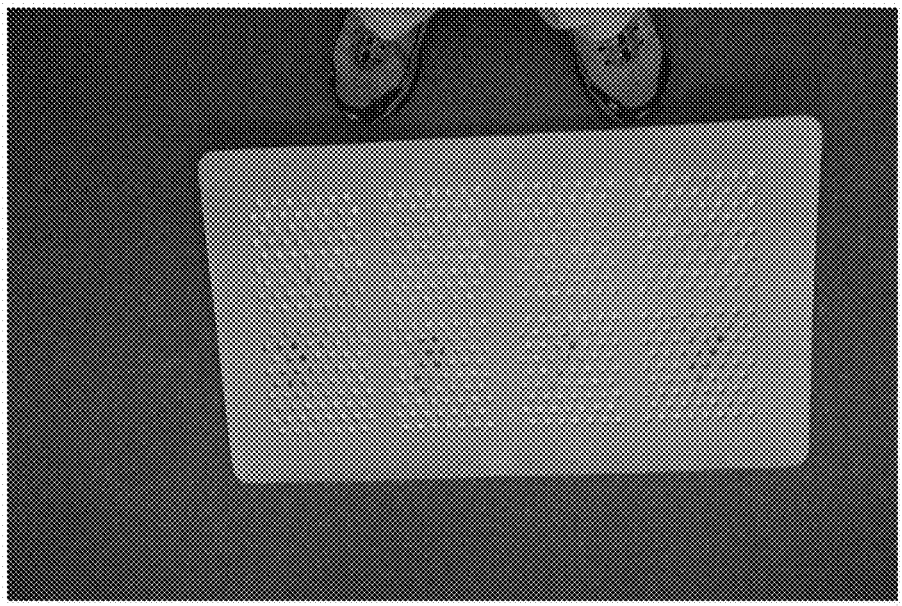
FIG. 12 shows a view of the top of the floor mat with a person standing next to the floor mat.
Figure 13:
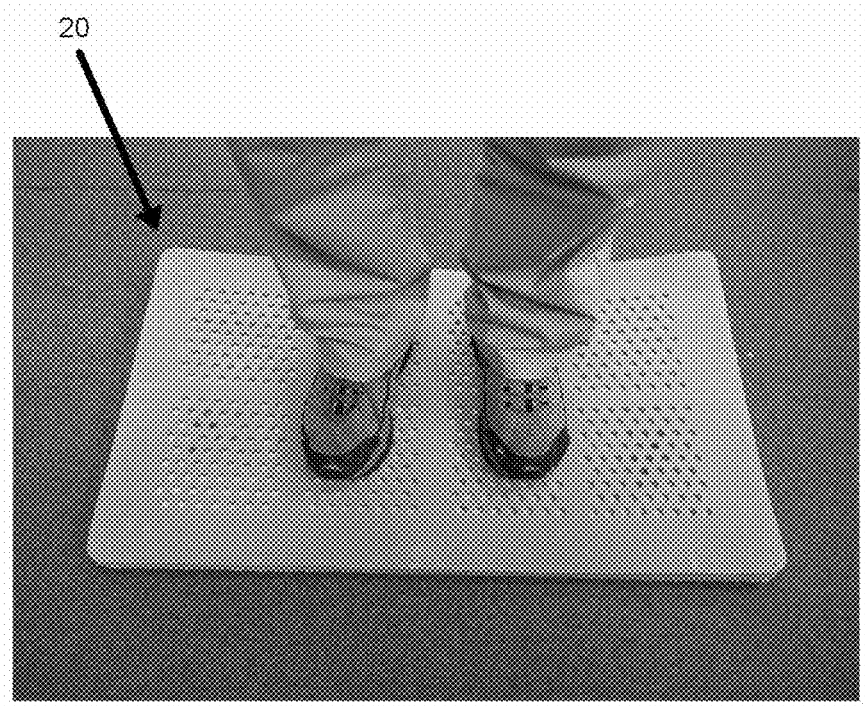
FIG. 13 shows a view of the top of the floor mat with a person standing on the floor mat.
Figure 14:
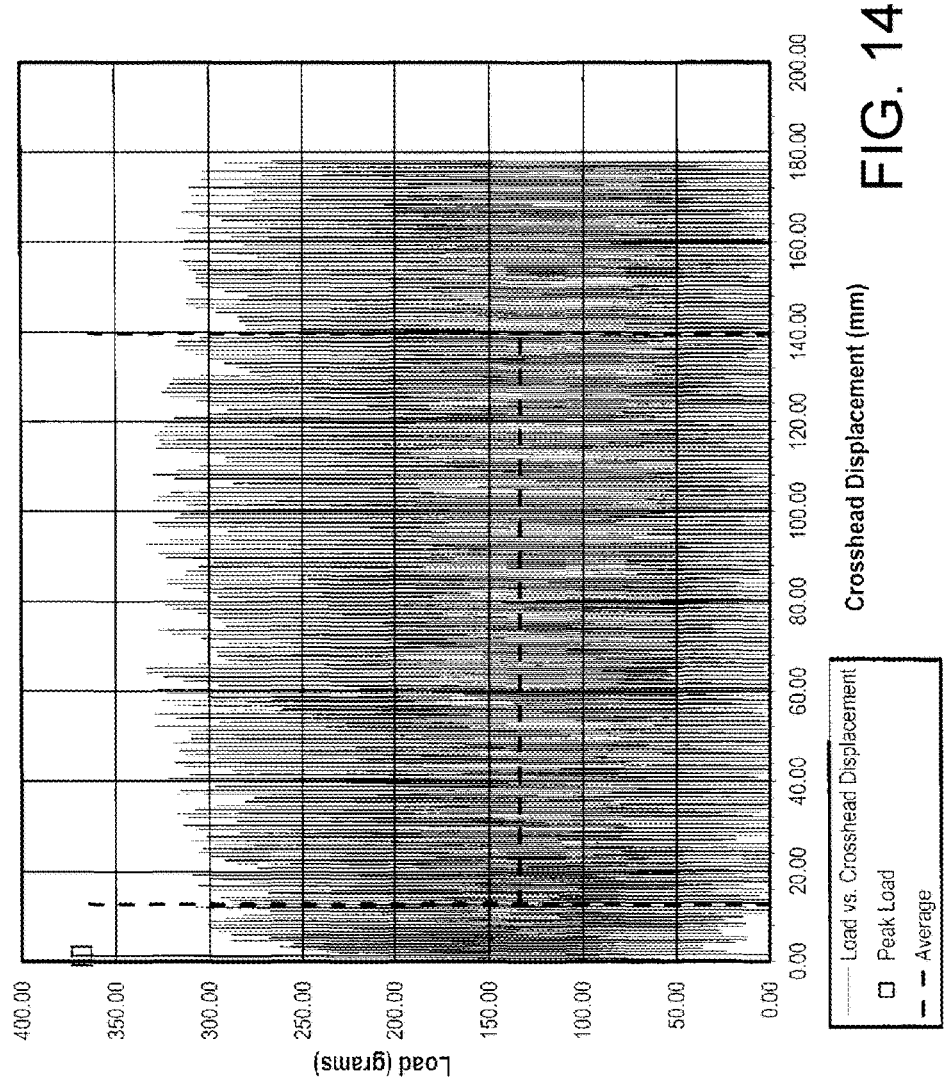
FIGS. 14, 15, and 16 show testing data.
Figure 15:
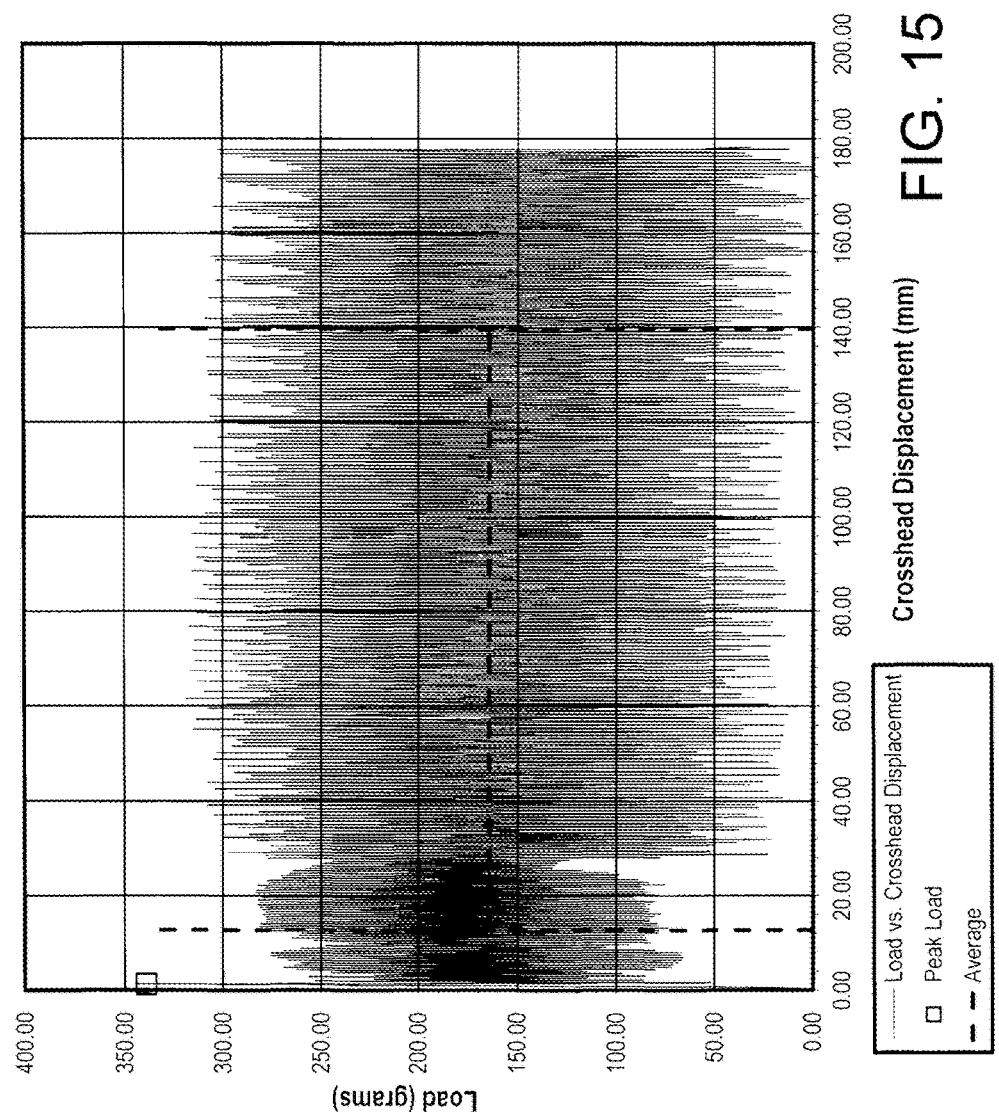
Figure 16:
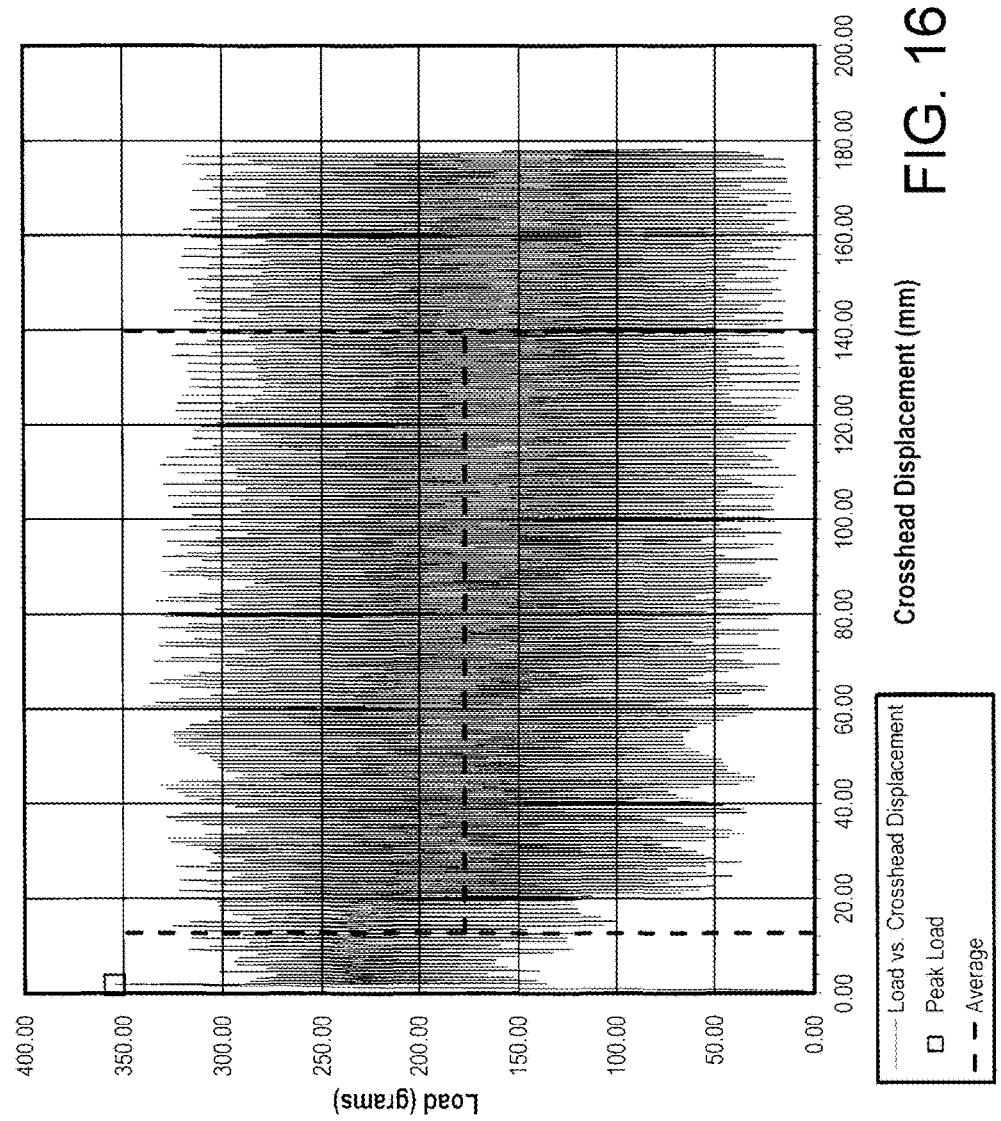
Figure 17:
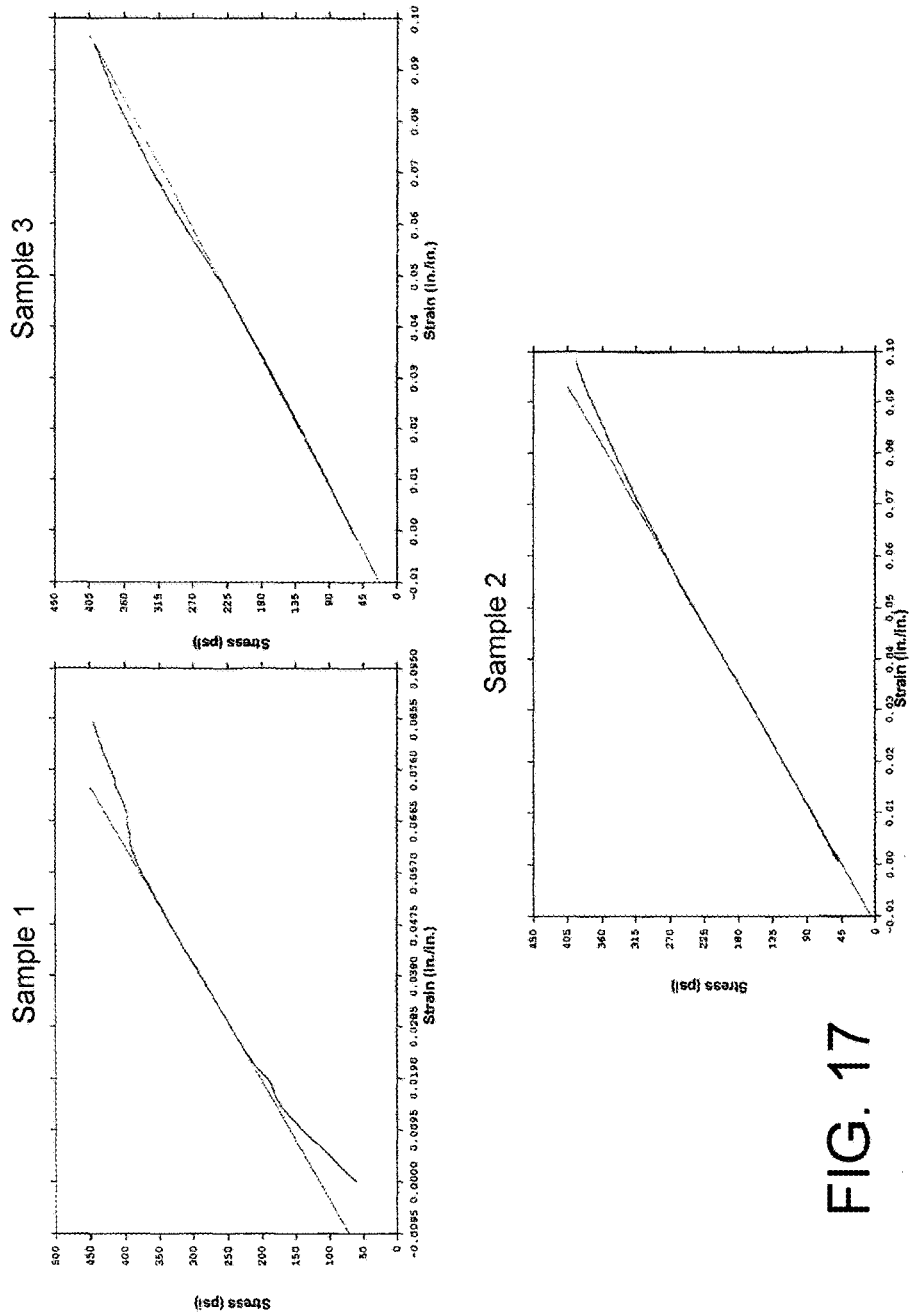
FIGS. 17 and 18 show additional testing data.
Figure 18:
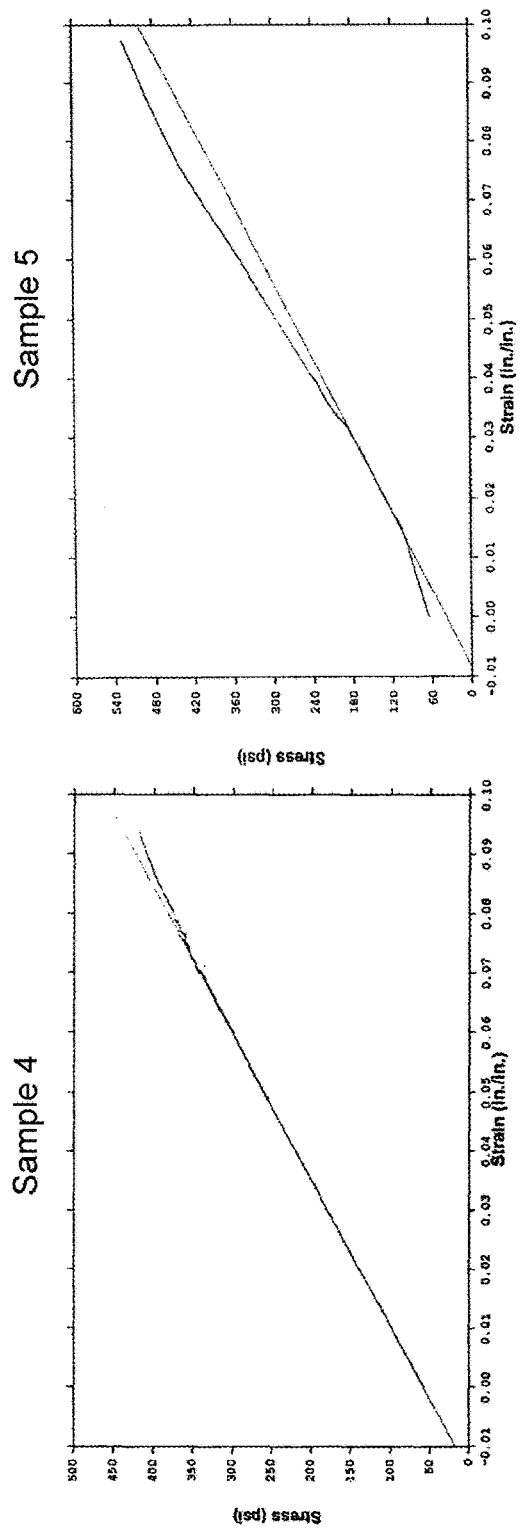

FIG. 12 shows a view of the top of the floor mat with a person standing next to the floor mat, and FIG. 13 shows a view of the top of the floor mat with the person standing on the floor mat.

FIGS. 14-18 show testing data discussed herein.

Figure 19:
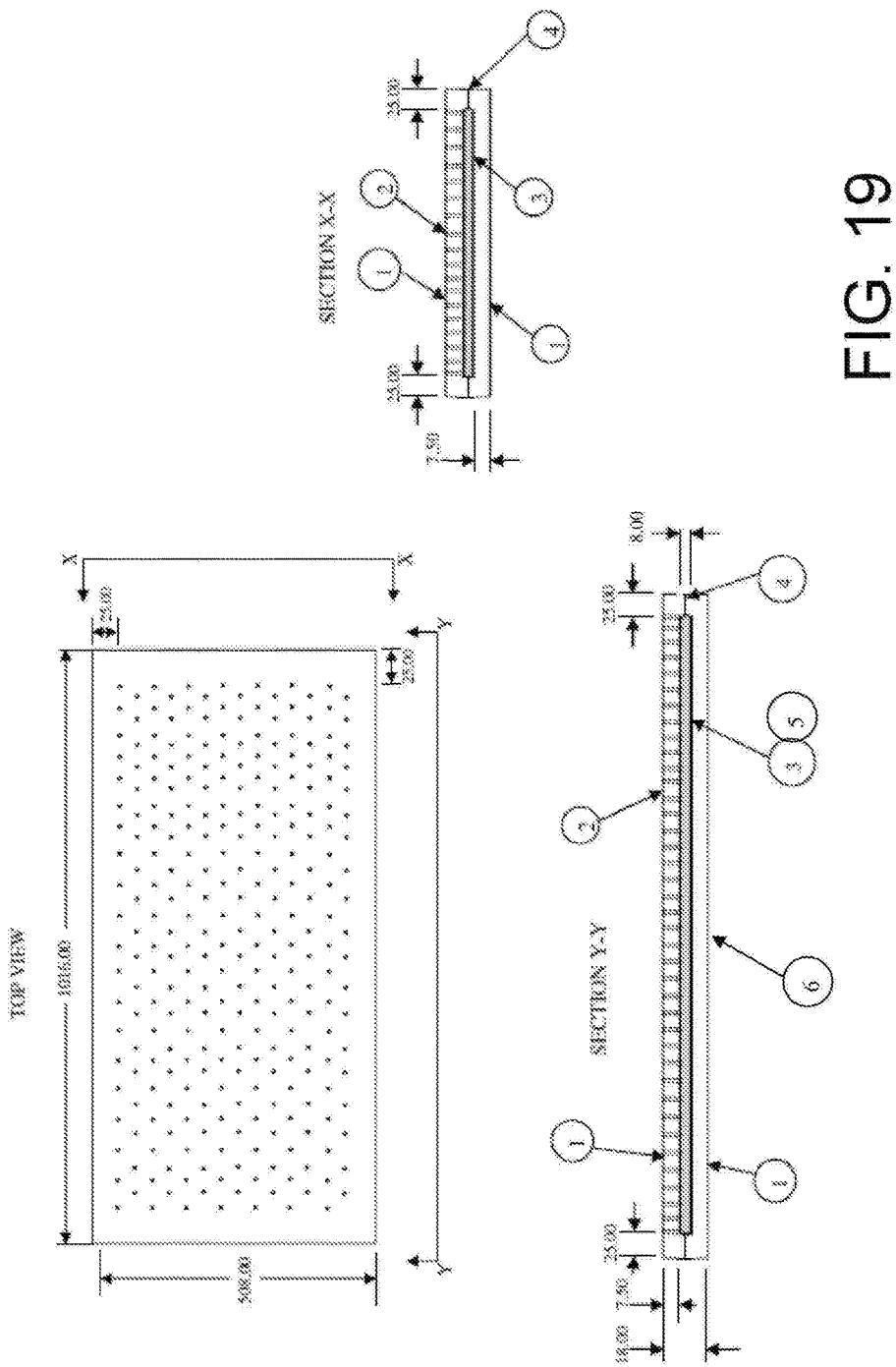
FIG. 19 shows schematic views of a floor mat.

FIG. 19 shows schematic views of a floor mat according to the application, with exemplary measurements of different dimensions and material information.

The first layer of the surgical room floor mat may possible be made of a material such as polypropylene.

The third layer 3 may comprise a polypropylene material and may be yellow in color. The connecting structure 22 may be a synthetic adhesive. The fourth layer 4 may comprise a polyethylene material and may be clear. The sixth layer 6 may comprise a polyvinylchloride (PVC) material and may be pink in color.

The ant-fatigue operating room mat of the present application may comprise cross-linked polyurethane foam layers. The holes in the mat may be ten millimeters in diameter, and may be spaced out twenty millimeters between the centerline of each hole. The absorbent polypropylene material may be yellow in color and may be eight millimeters thick. The glue may be placed on the mat twenty-five millimeters inwardly from the edge of the mat on all sides. The mat may comprise an impervious polyethylene backing on the yellow absorbent layer. The backing may be adhered to the yellow material. The non-slip material may be PVC and may be pink in color. The tolerances may be: .XX=+/−6.35 on dimensions >=20.00; +/−1.00 on dimensions <=20.00.

One feature or aspect of an exemplification is believed at the time of the filing of this patent application to possibly reside broadly in a method of reducing surgeon fatigue during an operation while reducing collection of fluids from the operation on the floor of the operating room by absorbing fluids leaking onto the floor of the operating room, said method comprising the steps of: providing an anti-fatigue operating room mat; said anti-fatigue operating room mat comprising an at least four layer mat; said at least four layer mat comprising a first foam layer with holes to permit entry of fluids into said mat with said first foam layer comprising a sufficient thickness and composition that absorbs shocks and reduces fatigue on a person standing on said anti-fatigue operating room mat; said first foam layer comprising a ball rebound sufficient to provide anti-fatigue properties to the surgeon; said at least four layer mat comprising a second layer, which second layer comprises an absorbency comprising a volume of absorbency, to sufficiently absorb, capture, contain, and retain operating room fluids otherwise deposited on the floor of the operating room where personnel would be working during performance of a surgical operation; said first foam layer and said second layer being held together by an adhesive layer adapted to the adhesive characteristics of both said first foam layer and said second layer; said at least four layer mat comprising a third layer, which third layer comprises an anti-skid or adhesive-like surface to minimize or prevent sliding or skidding of the anti-fatigue operating room mat; said third layer comprising a mesh or mesh-like structure formed from a plurality of criss-crossing or intersecting lines or strands of material, such that, said third layer comprises a plurality of irregularly-shaped and irregularly-spaced holes or openings thereon; said strands or lines of material comprising thicknesses having a substantially large ranges of thickness and/or diameters providing a coefficient of friction with the floor which is substantial and provides said anti-skid or adhesive-like surface; said at least four layer mat comprising a fourth layer disposed between said second layer and said third layer; and said fourth layer being substantially impervious to the passage of fluids therethrough.

Another feature or aspect of an exemplification is believed at the time of the filing of this patent application to possibly reside broadly in a surgical room mat for performing the method, configured to reduce surgeon fatigue during an operation while reducing collection of fluids from the operation on the floor of the operating room by absorbing fluids leaking onto the floor of the operating room, said surgical room mat comprising: at least a four layer mat; said at least four layer mat comprising a first foam layer with holes to permit entry of fluids into said mat with said first foam layer comprising a sufficient thickness and composition that absorbs shocks and reduces fatigue on a person standing on said anti-fatigue operating room mat; said first foam layer comprising a ball rebound sufficient to provide anti-fatigue properties to the surgeon; said at least four layer mat comprising a second layer, which second layer comprises an absorbency comprising a volume of absorbency, to sufficiently absorb, capture, contain, and retain operating room fluids otherwise deposited on the floor of the operating room where personnel would be working during performance of a surgical operation; said first foam layer and said second layer being held together by an adhesive layer adapted to the adhesive characteristics of both said first foam layer and said second layer; said at least four layer mat comprising a third layer, which third layer comprises an anti-skid or adhesive-like surface to minimize or prevent sliding or skidding of the anti-fatigue operating room mat; said third layer comprising a mesh or mesh-like structure formed from a plurality of criss-crossing or intersecting lines or strands of material, such that, said third layer comprises a plurality of irregularly-shaped and irregularly-spaced holes or openings thereon; said strands or lines of material comprising thicknesses having a substantially large ranges of thickness and/or diameters providing a coefficient of friction with the floor which is substantial and provides said anti-skid or adhesive-like surface; said at least four layer mat comprising a fourth layer disposed between said second layer and said third layer; and said fourth layer being substantially impervious to the passage of fluids therethrough.

The components disclosed in the patents, patent applications, patent publications, and other documents disclosed or incorporated by reference herein, may possibly be used in possible exemplifications of the present invention, as well as equivalents thereof.

The purpose of the statements about the technical field is generally to enable the Patent and Trademark Office and the public to determine quickly, from a cursory inspection, the nature of this patent application. The description of the technical field is believed, at the time of the filing of this patent application, to adequately describe the technical field of this patent application. However, the description of the technical field may not be completely applicable to the claims as originally filed in this patent application, as amended during prosecution of this patent application, and as ultimately allowed in any patent issuing from this patent application. Therefore, any statements made relating to the technical field are not intended to limit the claims in any manner and should not be interpreted as limiting the claims in any manner.

The appended drawings in their entirety, including all dimensions, proportions and/or shapes in at least one exemplification of the invention, are accurate and are hereby included by reference into this specification.

The background information is believed, at the time of the filing of this patent application, to adequately provide background information for this patent application. However, the background information may not be completely applicable to the claims as originally filed in this patent application, as amended during prosecution of this patent application, and as ultimately allowed in any patent issuing from this patent application. Therefore, any statements made relating to the background information are not intended to limit the claims in any manner and should not be interpreted as limiting the claims in any manner.

All, or substantially all, of the components and methods of the various exemplifications may be used with at least one exemplification or all of the exemplifications, if more than one exemplification is described herein.

The purpose of the statements about the object or objects is generally to enable the Patent and Trademark Office and the public to determine quickly, from a cursory inspection, the nature of this patent application. The description of the object or objects is believed, at the time of the filing of this patent application, to adequately describe the object or objects of this patent application. However, the description of the object or objects may not be completely applicable to the claims as originally filed in this patent application, as amended during prosecution of this patent application, and as ultimately allowed in any patent issuing from this patent application. Therefore, any statements made relating to the object or objects are not intended to limit the claims in any manner and should not be interpreted as limiting the claims in any manner.

All of the patents, patent applications, patent publications, and other documents cited herein, and in the Declaration attached hereto, are hereby incorporated by reference as if set forth in their entirety herein except for the exceptions indicated herein.

The summary is believed, at the time of the filing of this patent application, to adequately summarize this patent application. However, portions or all of the information contained in the summary may not be completely applicable to the claims as originally filed in this patent application, as amended during prosecution of this patent application, and as ultimately allowed in any patent issuing from this patent application. Therefore, any statements made relating to the summary are not intended to limit the claims in any manner and should not be interpreted as limiting the claims in any manner.

Some examples of surgical mats or surgeon mats or materials or components relating thereto, which may possibly be used in or incorporated for use in at least one possible exemplification of the present application, may possibly be found in the following U.S. Patents or U.S. Patent Publications: US20140076358; US20040261209; U.S. Pat. No. 8,839,812; U.S. Pat. No. 8,142,410; U.S. Pat. No. 7,785,692; U.S. Pat. No. 7,445,833; U.S. Pat. No. 7,309,519; U.S. Pat. No. 7,192,631; U.S. Pat. No. 6,610,382; U.S. Pat. No. 5,607,745; U.S. Pat. No. 5,173,346; U.S. Pat. No. 5,028,468; U.S. Pat. No. 4,822,669; U.S. Pat. No. 4,328,275; and U.S. Pat. No. 3,016,317. These patents and patent publications are incorporated by reference herein.

It will be understood that the examples of patents, patent applications, patent publications, and other documents which are included in this application and which are referred to in paragraphs which state "Some examples of . . . which may possibly be used in at least one possible exemplification of the present application . . . " may possibly not be used or useable in any one or more exemplifications of the application.

The sentence immediately above relates to patents, patent applications, patent publications, and other documents either incorporated by reference or not incorporated by reference.

All of the references and documents cited in any of the patents, patent applications, patent publications, and other documents cited herein, except for the exceptions indicated herein, are hereby incorporated by reference as if set forth in their entirety herein except for the exceptions indicated herein. All of the patents, patent applications, patent publications, and other documents cited herein, referred to in the immediately preceding sentence, include all of the patents, patent applications, patent publications, and other documents cited anywhere in the present application.

Words relating to the opinions and judgments of the author of all patents, patent applications, patent publications, and other documents cited herein and not directly relating to the technical details of the description of the exemplifications therein are not incorporated by reference.

The words all, always, absolutely, consistently, preferably, guarantee, particularly, constantly, ensure, necessarily, immediately, endlessly, avoid, exactly, continually, expediently, ideal, need, must, only, perpetual, precise, perfect, require, requisite, simultaneous, total, unavoidable, and unnecessary, or words substantially equivalent to the above-mentioned words in this sentence, when not used to describe technical features of one or more exemplifications of the patents, patent applications, patent publications, and other documents, are not considered to be incorporated by reference herein for any of the patents, patent applications, patent publications, and other documents cited herein.

The description of the exemplification or exemplifications is believed, at the time of the filing of this patent application, to adequately describe the exemplification or exemplifications of this patent application. However, portions of the description of the exemplification or exemplifications may not be completely applicable to the claims as originally filed in this patent application, as amended during prosecution of this patent application, and as ultimately allowed in any patent issuing from this patent application. Therefore, any statements made relating to the exemplification or exemplifications are not intended to limit the claims in any manner and should not be interpreted as limiting the claims in any manner.

The details in the patents, patent applications, patent publications, and other documents cited herein may be considered to be incorporable, at applicant's option, into the claims during prosecution as further limitations in the claims to patentably distinguish any amended claims from any applied prior art.

The purpose of the title of this patent application is generally to enable the Patent and Trademark Office and the public to determine quickly, from a cursory inspection, the nature of this patent application. The title is believed, at the time of the filing of this patent application, to adequately reflect the general nature of this patent application. However, the title may not be completely applicable to the technical field, the object or objects, the summary, the description of the exemplification or exemplifications, and the claims as originally filed in this patent application, as amended during prosecution of this patent application, and as ultimately allowed in any patent issuing from this patent application. Therefore, the title is not intended to limit the claims in any manner and should not be interpreted as limiting the claims in any manner.

The abstract of the disclosure is submitted herewith as required by 37 C.F.R. § 1.72(b). As stated in 37 C.F.R. § 1.72(b):

A brief abstract of the technical disclosure in the specification must commence on a separate sheet, preferably following the claims, under the heading "Abstract of the Disclosure." The purpose of the abstract is to enable the Patent and Trademark Office and the public generally to determine quickly from a cursory inspection the nature and gist of the technical disclosure. The abstract shall not be used for interpreting the scope of the claims.

Therefore, any statements made relating to the abstract are not intended to limit the claims in any manner and should not be interpreted as limiting the claims in any manner.

The exemplifications of the invention described herein above in the context of the preferred exemplifications are not to be taken as limiting the exemplifications of the invention to all of the provided details thereof, since modifications and variations thereof may be made without departing from the spirit and scope of the exemplifications of the invention.

What is claimed is:

1. An absorbent, anti-fatigue operating room mat comprising:
   a support layer to be disposed on the floor of an operating room during performance of an operating room procedure;
   a fluid-resistant layer being disposed on top of said support layer during performance of an operating room procedure;
   a fluid-absorbent layer being disposed on top of said fluid-resistant layer during performance of an operating room procedure;
   a shock-absorbing layer being disposed on top of said fluid-absorbent layer during performance of an operating room procedure;
   said shock-absorbing layer comprising shock-absorbing foam material to absorb shocks and reduce fatigue on operating room personnel standing on said anti-fatigue operating room mat;
   said shock-absorbing layer comprising holes to permit passage of operating room fluids, generated during performance of an operating room procedure, through said shock-absorbing layer and to said fluid-absorbent layer;
   said fluid-absorbent layer comprising a fluid-absorbent material to absorb, capture, contain, and retain operating room fluids that pass through said holes in said shock-absorbing layer to thereby minimize deposition of the operating room fluids on the floor of an operating room;
   said fluid-resistant layer comprising a fluid-resistant material to resist the passage of operating room fluids, not absorbed by said fluid-absorbent layer, through and out of said anti-fatigue operating room mat; and
   said support layer comprising an anti-skid material to minimize or prevent unwanted sliding or skidding of the anti-fatigue operating room mat on the floor of an operating room during performance of an operating room procedure.

2. The absorbent, anti-fatigue operating room mat according to claim 1, wherein:
   said support layer comprises a first support layer and a second support layer;
   said first support layer comprises said anti-skid material; and
   said second support layer comprises said shock-absorbing foam material.

3. The absorbent, anti-fatigue operating room mat according to claim 2, wherein the absorbent, anti-fatigue operating room mat further comprises a protective layer disposed between said shock-absorbing layer and said fluid-absorbent layer, which protective layer comprises a protective material to minimize mechanical or structural damage to said fluid-absorbent layer.

4. The absorbent, anti-fatigue operating room mat according to claim 3, wherein said protective material is a liquid-permeable polypropylene material.

5. The absorbent, anti-fatigue operating room mat according to claim 4, wherein said protective layer is translucent or transparent or a see-through printed netting.

6. The absorbent, anti-fatigue operating room mat according to claim 2, wherein said anti-skid material is a polyvinyl chloride material or a polyvinyl chloride foam material.

7. The absorbent, anti-fatigue operating room mat according to claim 6, wherein said polyvinyl chloride material or polyvinyl chloride foam material comprises:
   a coefficient of static friction according to ASTM standard D1894-14 of 1.70+/−25%;
   a coefficient of kinetic friction according to ASTM standard D1894-14 of 0.763+/−25%;
   a density according to Method A of ASTM D792-13 in grams per cubic centimeter of 0.524+/−25%;
   a tensile strength according to ASTM D638-14 of 436 psi +/−25%;
   a modulus of elasticity according to ASTM D638-14 of 4150 psi +/−25%; and
   an elongation percentage according to ASTM D638-14 of 10.9 +/−25%.

8. The absorbent, anti-fatigue operating room mat according to claim 2, wherein said shock-absorbing foam material is a closed cell, polyurethane foam.

9. The absorbent, anti-fatigue operating room mat according to claim 8, said closed cell, polyurethane foam comprises:
   a density according to ASTM D3574-11, sections 9-15, of 21.4 kilograms per cubic meter +/−25%;
   a compression set percentage according to ASTM D3574-11, sections 37-44, of 53.4+/−25%; and
   a ball rebound percentage according to ASTM D3574-11, sections 68-75, of 45.2+/−25%.

10. The absorbent, anti-fatigue operating room mat according to claim 2, wherein said first support layer of anti-skid material comprises a mesh formed from a plurality of criss-crossing or intersecting lines or strands of material having a plurality of irregularly-shaped and irregularly-spaced holes or openings therein.

11. The absorbent, anti-fatigue operating room mat according to claim 10, wherein:
   said mesh comprises 60-90 holes or openings +/−25%; and
   the strands or lines of material in the mesh comprises a thickness and/or diameter in the range of 0.5-2.5 mm +/−25%.

12. The absorbent, anti-fatigue operating room mat according to claim 1, wherein said shock-absorbing foam material is a closed cell, polyurethane foam.

13. The absorbent, anti-fatigue operating room mat according to claim 12, wherein said closed cell, polyurethane foam comprises:
   a density according to ASTM D3574-11, sections 9-15, of 21.4 kilograms per cubic meter +/−25%;
   a compression set percentage according to ASTM D3574-11, sections 37-44, of 53.4+/−25%; and
   a ball rebound percentage according to ASTM D3574-11, sections 68-75, of 45.2+/−25%.

14. The absorbent, anti-fatigue operating room mat according to claim 1, wherein said fluid-resistant material comprises a polyethylene or similar material that is resistant to the passage of fluids therethrough.

15. The absorbent, anti-fatigue operating room mat according to claim 1, wherein said fluid-absorbent material is a polypropylene material or a polypropylene fibrous material.

16. The absorbent, anti-fatigue operating room mat according to claim 15, wherein said polypropylene material or said polypropylene fibrous material comprises a volume of absorbency in the range of 17-20 fluid ounces +/−25% of liquid per square foot of material, measured as a linear product.

17. The absorbent, anti-fatigue operating room mat according to claim 15, wherein said polypropylene material or said polypropylene fibrous material comprises a volume of absorbency in the range of 58-61 fluid ounces +/−25% of liquid per cubic foot of material, measured in a volumetric manner.

18. The absorbent, anti-fatigue operating room mat according to claim 1, wherein said holes are 8-15 millimeters in diameter +/−25%.

19. The absorbent, anti-fatigue operating room mat according to claim 1, wherein:
- said support layer and said shock-absorbing layer comprise essentially the same shape and surface area;
- each of said fluid-resistant layer and said fluid-absorbent layer comprises a lesser surface area than said support layer and said shock-absorbing layer, such that an outer surface portion of said shock-absorbing layer is in contact with an outer surface portion of said support layer; and
- said outer surface portions are connected together to enclose or sandwich said fluid-resistant layer and said fluid-absorbent layer therein to minimize and/or prevent the passage of operating room fluids out between said support layer and said shock-absorbing layer.

20. The absorbent, anti-fatigue operating room mat according to claim 1, wherein said fluid-resistant layer comprises a thin, clear film.

* * * * *